July 10, 1928.
J. P. MALONE
1,676,958
FUEL MIXING DEVICE
Filed Feb. 13, 1926
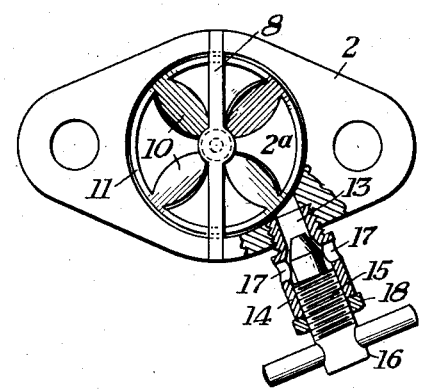
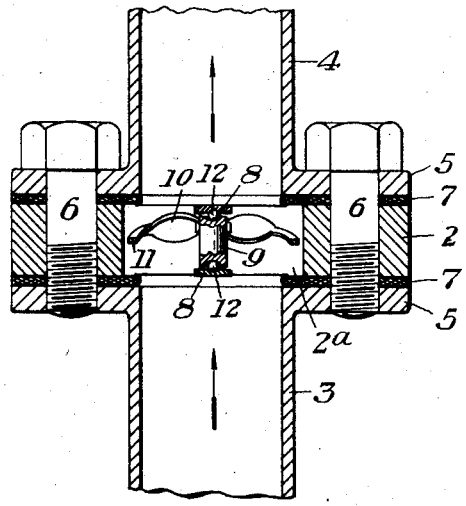
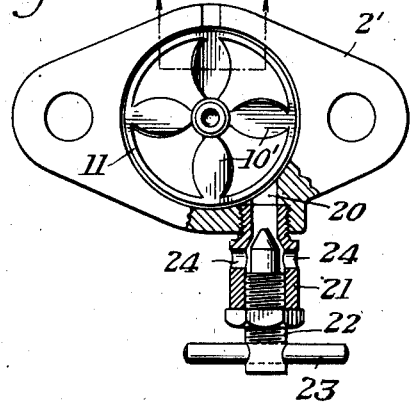
INVENTOR Patented July 10, 1928.

1,676,958

UNITED STATES PATENT OFFICE.

JAMES P. MALONE, OF PITTSBURGH, PENNSYLVANIA.

FUEL-MIXING DEVICE.

Application filed February 13, 1926. Serial No. 88,026.

This invention relates to internal combustion engines, and more particularly to a fuel mixing device for insuring a thorough and uniform mixture of the air and gasoline used as fuel for the engine, and for supplying additional air to the fuel mixture.

Various forms of fuel mixing devices have heretofore been proposed which are in the nature of a coupling interposed between the carburetor and the intake manifold and which have a fan-like wheel carried therein, which is so arranged as to be whirled around by the current of air and gasoline passing to the engine. The mixture of air and gasoline is broken up by the whirling fan blades so that the gasoline is uniformly distributed through the air and any large particles of raw gasoline are atomized and distributed through the mixture.

It has also been proposed to provide such devices with an auxiliary air intake, so that additional air may be supplied to the mixture.

The present invention relates to a device of this general type, but has for its object to provide an arrangement wherein the incoming current of auxiliary air is directed against the blades of the fan in such a way as to assist in rotating the fan wheel. It is, furthermore, proposed that this current of air shall enter in such a way as to be deflected by the fan blades into the intake passage in the same direction as the flow of gases through the intake passage. With such an arrangement, the incoming current of auxiliary air will not act in opposition to the current of air coming through the intake passage to retard the rotation of the fan or to oppose the current of mixture in the intake passage. On the other hand, the incoming current of air will tend to accelerate the speed of the fan and will cause a thorough commingling of the incoming air with the fuel mixture, and prevent stratification of the auxiliary air and the fuel mixture.

The invention has, as a further object, to provide a valve for controlling the admission of the proper amount of air through the auxiliary passage, this valve being readily adjustable to the proper setting.

A further object of the invention is to provide, in a device of this kind, a fan wheel which will be of a rugged construction, and wherein the ends of the vanes or blades will be secured together, thereby bracing the vanes, and affording protection thereto, especially in the event of a back-fire in the intake manifold.

The invention may be readily understood by reference to the accompanying drawings, wherein:

Figure 1 is a plan view of a device embodying my invention, part of the device being broken away to show the auxiliary air inlet passage and the manually adjustable valve for controlling the same.

Figure 2 illustrates a vertical section through a device as shown in Fig. 1, showing the device coupled between a carburetor and the intake manifold.

Figure 3 is a view similar to Fig. 1, of a slightly modified arrangement, wherein the auxiliary air may be directed against the vanes of the fan wheel more effectively.

Figure 4 is a detail view on the line 4—4 of Fig. 1, showing a portion of the fan wheel only, to illustrate the pitch or inclination of the vanes.

In the drawings, 2 designates a body member of a suitable shape, to be coupled in the usual union between the top of the carburetor 3 and the lower end of the intake manifold 4. The top of the carburetor 3 and the bottom of the intake manifold 4 are flanged, as indicated at 5, and securing bolts or screws are passed through these flanges, and through suitable openings in the body 2, to secure the parts in place. If desired, suitable gaskets 7 may be provided on the upper and lower faces of the body 2.

Within the body 2 is a central opening $2^a$ which is of preferably slightly greater diameter than the diameter of the passages in parts 3 and 4. Supported by cross members 8 on the body 2 within the opening $2^a$ is a hub member 9 which carries a fan wheel having blades 10. The fan wheel and blades are preferably formed from a single stamping of sheet metal and the ends of the blades are connected by a rim 11. The hub 9 is pivotally supported in the cross pieces 8 in any suitable way. I prefer, however, that some anti-friction means, such as ball bearings 12, be provided at opposite ends of the hub, in order to permit of a free rotation of the fan wheel.

Passing through a side wall of the body 2 is an auxiliary air inlet passage 13, into which is secured a valve member 14. The valve member 14 has a threaded plug 15 therein which has a handle 16 thereon. This plug is for the purpose of controlling the effective flow of air from ports 17 to the inlet passage 13. A lock nut 18 is preferably carried on the stem of the plug for locking the valve in the position to which it is adjusted.

The passage 13 is positioned in the plane of the vanes of the fan wheel and is out of line with the center thereof. It is so disposed that air passing through the passage 13 will impinge against the vanes 10 to tend to rotate them in the same direction that they are rotated by a current of fuel mixture passing up through the carburetor outlet 3. Striking the blades at this inclination, the air will be deflected upwardly toward the passage 4 and in the general direction of flow of gases through the entire intake passage.

By reason of the fact that the air enters the chamber 2$^a$ at this particular point, so as to assist in rotating the fan wheel, the fan wheel will be revolved at a much higher speed than if the air passage 13 were not provided, and than if this passage were at some other point. Since the wheel is whirled at a higher speed, the device functions more effectively as a mixer, and stratification of the raw air and fuel mixture is more effectively prevented.

This arrangement is particularly important where the carburetor is being choked for starting the engine. When the carburetor is choked, there is a minimum flow of air up the passage 3, and a relatively heavy flow of gasoline. The current of air is normally not sufficient to thoroughly atomize the gasoline and the gasoline goes to the engine in a more or less raw state. With the present invention, the small amount of air admitted through the auxiliary passage 13 will cause the fan wheel to be revolved at a relatively high velocity, and thereby break up the raw gasoline and cause it to be thoroughly mixed with the air that is passing to the engine.

By reason of the manually adjustable valve for controlling the air supply, the amount of auxiliary air can be very closely regulated to the needs of any particular engine, and adjustment may be made from time to time, as necessary.

In the modification shown in Fig. 3, 2' designates the body and 10' designates the blades of the fan wheel. The auxiliary air inlet passage 20 is disposed, in this modification, at an angle where it will more effectively increase the velocity of the fan than in the arrangement shown in Fig. 1.

The rim 11 being integral with the fan blades serves to tie the vanes together and effectively brace them, and provide a bracing therefor which will resist backfiring. This enables the fan to be made of extremely light material without danger of its being mutilated in the normal use thereof.

As shown in Figs. 3 and 4, the rim 11 preferably has portions which conform to the inclination of the vanes at their outer ends, thereby affording additional inclined surfaces against which the incoming air may impinge.

The valve 21, with the adjustable plug 22 and handle 23, with inlet ports 24, is the same as that disclosed in Fig. 1.

While I have illustrated and described a preferred embodiment of the invention, it will be understood that various changes may be made in the construction thereof, without departing from the spirit of my invention.

I claim as my invention:

A fuel mixing device of the class described including a body member, supporting means on the body member, a fan wheel rotatably mounted on the supporting means, said fan wheel having a plurality of vanes, and a sinuous rim connecting the outer ends of the several vanes, and an auxiliary air inlet passage through the body in the plane of the wheel and opening toward the wheel out of line with the center thereof, said sinuous rim permitting air entering through the opening to contact with the vanes of the wheel.

In testimony whereof I have hereunto set my hand.

JAMES P. MALONE.